No. 862,299.
PATENTED AUG. 6, 1907.
C. F. WHISLER.
WIND WHEEL.
APPLICATION FILED MAY 21, 1906.
2 SHEETS—SHEET 1.
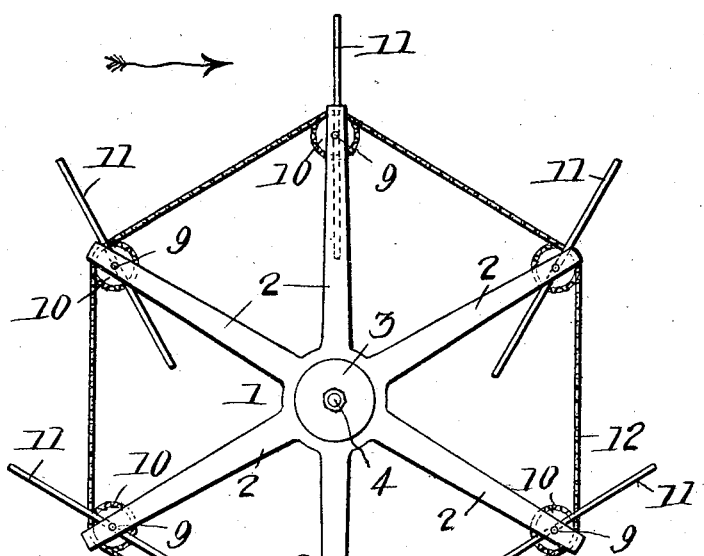
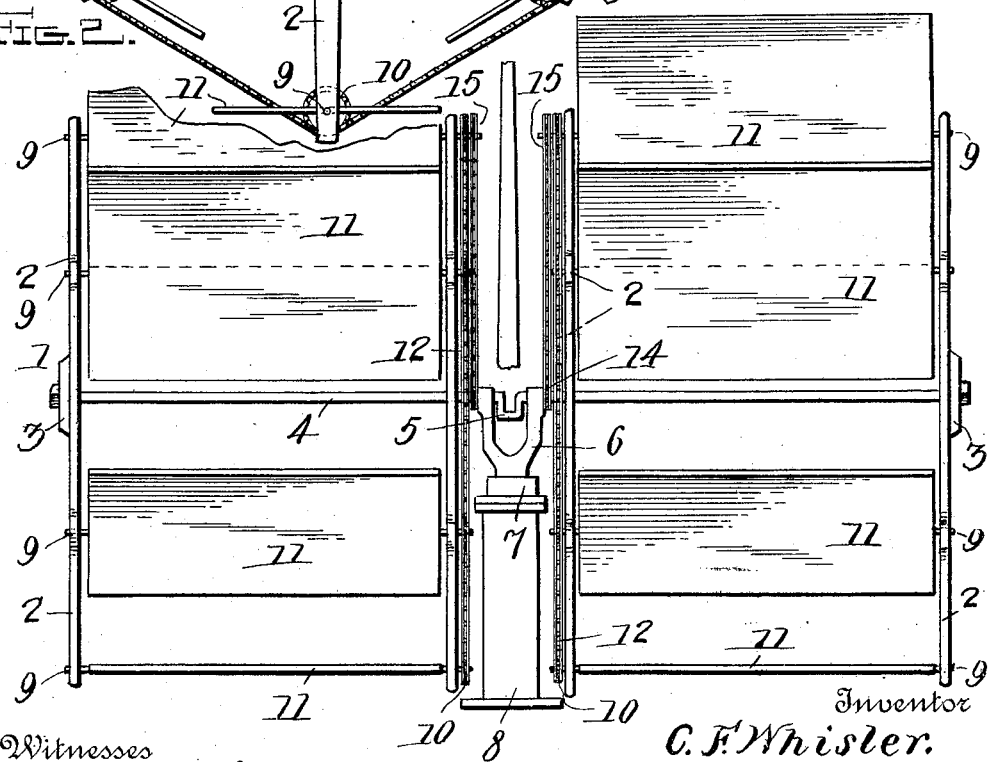
Witnesses
Jas. A. Kaehl
C. H. Griesbauer
Inventor
C. F. Whisler.
by H. B. Willson & Co.
Attorneys

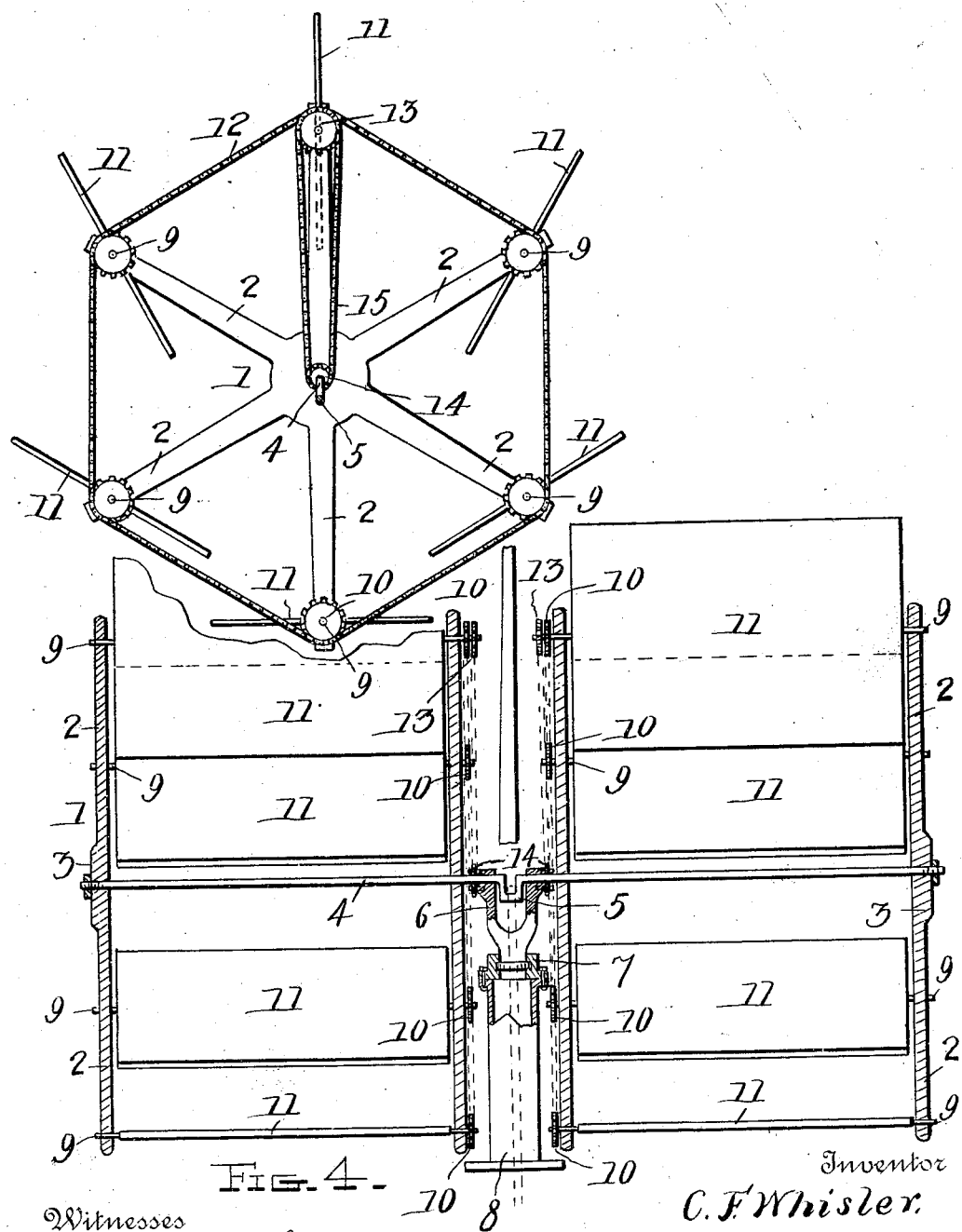

UNITED STATES PATENT OFFICE.

CHARLES F. WHISLER, OF HILLSBORO, OHIO.

WIND-WHEEL.

No. 862,299.　　　Specification of Letters Patent.　　　Patented Aug. 6, 1907.

Application filed May 21, 1906. Serial No. 317,977.

*To all whom it may concern:*

Be it known that I, CHARLES F. WHISLER, a citizen of the United States, residing at Hillsboro, in the county of Highland and State of Ohio, have invented certain new and useful Improvements in Wind-Wheels; and I do declare the following to be a full, clear, and exact description of the invention, such as will enable others skilled in the art to which it appertains to make and use the same.

This invention relates to wind wheels, and one of the principal objects of the same is to provide means for automatically feathering the blades or vanes of the wheel.

Another object is to provide a wheel, the vanes of which are mounted upon shafts journaled in a frame and provided with sprocket wheels connected by chains to a sprocket wheel on a main axle, by means of which the blades are presented flatwise at one side of the wheel to the wind, and at the opposite side of the wheel the vanes are presented edgewise.

These and other objects are accomplished by means of the construction illustrated in the accompanying drawing, in which,—

Figure 1 is a side elevation of a wind wheel made in accordance with my invention; Fig. 2 is a front elevation of the same; Fig. 3 is a central vertical section of the same; and Fig. 4 is a vertical section through the center of the wheels.

Referring to the accompanying drawing for a more particular description of my invention, the numeral 1 designates the frame of the wheel comprising radial spokes or arms 2, and a central hub 3, two of said frames being utilized for each wheel, and a central shaft 4 extends through the hubs 3 of both wheels, and is provided with a central crank 5. The shaft 4 is mounted in a yoke 6, the lower end of which is supported to rotate axially in a bearing 7 at the upper end of the tubular pump rod casing 8. Journaled in the outer ends of the spokes 2 are shafts 9, to one end of each of which a sprocket wheel 10 is fixed. The blades or vanes 11 are each secured at their longitudinal center to the shaft 9. A chain 12 passes around over the sprocket wheels 10. To two of the shafts 9 are secured supplemental sprocket wheels 13, and passing around these sprocket wheels and around sprocket wheels 14 rigid with the yoke 6 are chains 15. It is to be noted that the sprocket wheels 13 are provided with twice the number of sprockets carried by the wheels 14.

The operation of my invention may be described as follows: Assuming that the wind is blowing in the direction of the arrow in Fig. 1, it will be seen that the upper vane or blade 11 presents its side to the wind, and as this blade moves from a vertical position around to the opposite side of the wheel, the vane assumes a horizontal position with its edge to the wind, this action being assured by means of the sprocket wheels 10, 13, 14, and as the vane 11 progresses, it again assumes a vertical position when it reaches the upper end of the wheel, as will be understood.

From the foregoing, it will be obvious that a wheel made in accordance with my invention may be used as a water wheel or as a propeller wheel for boats, said wheel being automatically feathered by means of the sprocket wheels and chains as described.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

In a windmill, the combination with a tubular pump rod casing and a yoke rotatably mounted therein and carrying rigid sprocket wheels, of a wheel comprising radially-projecting arms or spokes, shafts mounted to rotate in the outer ends of the spokes, vanes or blades carried by the shafts, sprocket wheels fixed to the shafts, a chain connecting said sprocket wheels, a supplemental sprocket wheel fixed to one of the shafts, a main shaft projecting through the yoke and sprocket wheels carried by said yoke, and a chain connecting the last-named sprocket wheels and the supplemental sprocket wheel.

In testimony whereof I have hereunto set my hand in presence of two subscribing witnesses.

CHARLES F. WHISLER.

Witnesses:
N. CRAIG MCBRIDE,
J. FRANK WILSON.